United States Patent
Parthasarathy et al.

(10) Patent No.: US 12,415,401 B2
(45) Date of Patent: Sep. 16, 2025

(54) VIRTUAL DOOR SENSOR FOR TRANSPORT UNIT

(71) Applicant: THERMO KING LLC, Minneapolis, MN (US)

(72) Inventors: Girija Parthasarathy, Maple Grove, MN (US); Stephanie Deckas Benson, Prior Lake, MN (US)

(73) Assignee: THERMO KING LLC, Minneapolis, MN (US)

( * ) Notice: Subject to any disclaimer, the term of this patent is extended or adjusted under 35 U.S.C. 154(b) by 428 days.

(21) Appl. No.: 17/452,915

(22) Filed: Oct. 29, 2021

(65) Prior Publication Data
US 2023/0133586 A1   May 4, 2023

(51) Int. Cl.
*B60H 1/00* (2006.01)

(52) U.S. Cl.
CPC ....... *B60H 1/0073* (2019.05); *B60H 1/00364* (2013.01); *B60H 1/00371* (2013.01); *B60H 1/00735* (2013.01); *B60H 2001/00733* (2019.05)

(58) Field of Classification Search
CPC .............. B60H 1/0073; B60H 1/00364; B60H 1/00371; B60H 1/00735; B60H 2001/00733; B60H 1/00792; B60H 1/3232; B60H 1/00; B60H 1/32; B60P 3/20; B60W 50/0097; B60W 2050/0005; B60W 2050/0028; F25D 11/00; F25D 29/00; F25D 11/003; B61D 27/00; H04Q 9/00; G08B 21/182
See application file for complete search history.

(56) References Cited

U.S. PATENT DOCUMENTS

| | | |
|---|---|---|
| 8,682,751 B1 | 3/2014 | Antony |
| 9,470,797 B2 | 10/2016 | Walgren et al. |
| 9,607,282 B2 | 3/2017 | Brosius, III |
| 9,920,971 B2 | 3/2018 | Jin et al. |
| 10,634,409 B2 * | 4/2020 | Jin ..................... B60H 1/00014 |
| 10,678,611 B2 | 6/2020 | Grundy et al. |
| 11,004,236 B2 | 5/2021 | Mustafi et al. |

(Continued)

FOREIGN PATENT DOCUMENTS

| | | | | |
|---|---|---|---|---|
| KR | 20180068632 A | * | 6/2018 | ............. F25D 29/00 |
| WO | WO-2017165518 A1 | * | 9/2017 | ......... B60H 1/00657 |

(Continued)

OTHER PUBLICATIONS

Pragati Baheti, A Simple Guide to Data Preprocessing in Machine Learning, Aug. 31, 2021, retrieved from—https://www.v7labs.com/blog/data-preprocessing-guide, 12 pages (Year: 2021).*

(Continued)

*Primary Examiner* — Yongjia Pan
(74) *Attorney, Agent, or Firm* — HSML P.C.

(57) ABSTRACT

A method of providing a virtual door sensor for a transport unit is disclosed. The method includes monitoring operation of a transport climate control system for a climate controlled space to obtain transport climate control system operating data; transforming the transport climate control system operating data into door event model inputs; predicting a door event based on the obtained door event model inputs; and transmitting a notification according to the predicted door event.

21 Claims, 8 Drawing Sheets

(56) References Cited

U.S. PATENT DOCUMENTS

| | | | |
|---|---|---|---|
| 2005/0080806 A1* | 4/2005 | Doganata | G06F 11/2257 707/999.102 |
| 2007/0157640 A1 | 7/2007 | Bolger et al. | |
| 2007/0225871 A1 | 9/2007 | Karstens | |
| 2011/0193710 A1* | 8/2011 | McIlvain | B60P 3/20 220/1.5 |
| 2015/0226475 A1* | 8/2015 | Choi | F25D 29/00 62/158 |
| 2015/0306937 A1* | 10/2015 | Kitamura | G05D 23/1931 701/36 |
| 2016/0238406 A1* | 8/2016 | Burtner | G06F 16/22 |
| 2017/0082335 A1* | 3/2017 | Jin | H04Q 9/00 |
| 2018/0180340 A1* | 6/2018 | Jones | F25B 49/027 |
| 2018/0224150 A1* | 8/2018 | Lewis | F25D 29/008 |
| 2018/0314947 A1* | 11/2018 | Morris, II | G06N 20/20 |
| 2019/0078833 A1* | 3/2019 | Graziano | F25D 29/005 |
| 2019/0331409 A1* | 10/2019 | Jung | H04L 12/2825 |
| 2020/0047587 A1* | 2/2020 | Maeng | B60H 1/00264 |
| 2020/0262268 A1 | 8/2020 | Williams et al. | |
| 2020/0262270 A1 | 8/2020 | Williams et al. | |
| 2021/0150273 A1 | 5/2021 | Mustafi et al. | |
| 2021/0207884 A1* | 7/2021 | Park | F25D 11/02 |
| 2021/0381861 A1* | 12/2021 | Brown | G05D 22/02 |
| 2022/0065523 A1* | 3/2022 | Du | F25D 29/00 |
| 2022/0092962 A1* | 3/2022 | Grinshtain | F25D 11/003 |
| 2022/0099357 A1* | 3/2022 | Jackson | F25D 29/00 |
| 2022/0182300 A1* | 6/2022 | Slegers | H04L 43/028 |
| 2023/0244195 A1* | 8/2023 | Subbloie | H02H 1/0007 700/47 |

FOREIGN PATENT DOCUMENTS

| | | |
|---|---|---|
| WO | 2020/142061 | 7/2020 |
| WO | 2020/152684 | 7/2020 |

OTHER PUBLICATIONS

Jason Brownlee, How to Perform Data Cleaning for Machine Learning with Python, Jun. 30, 2020, retrieved from—https://machinelearningmastery.com/basic-data-cleaning-for-machine-learning/, 24 pages (Year: 2020).*

How to clean data in Python for Machine Learning?, Jun. 9, 2021, retrieved from—https://www.analyticsvidhya.com/blog/2021/06/how-to-clean-data-in-python-for-machine-learning/, 6 pages (Year: 2021).*

Álvarez-Bermejo et al., "Image processing methods to evaluate tomato and zucchini damage in postharvest stages", International Journal of Agricultural and Biological Engineering, Jan. 2017, 9 pages.

Komatsu et al., "Image Recognition Technology that Helps Save Energy in Room Air Conditioners", Hitachi Review, vol. 64, No. 8, 2015, 6 pages.

Extended European Search Report, issued in the corresponding European patent application No. 22204568.4, dated Mar. 24, 2023, 8 pages.

Extended European Search Report, issued in the corresponding European patent application No. 22204568.4, dated Jun. 4, 2024, 5 pages.

* cited by examiner

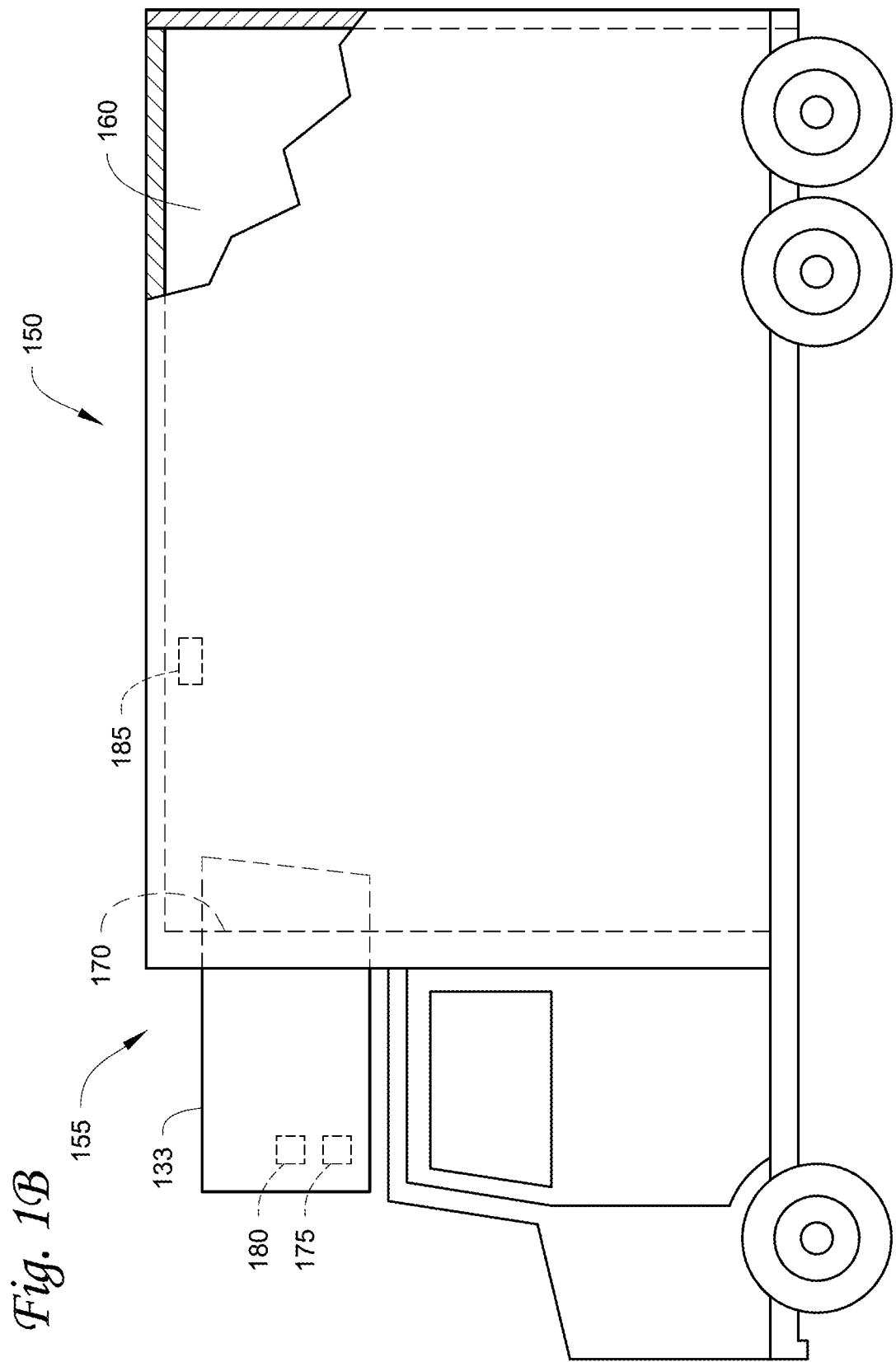

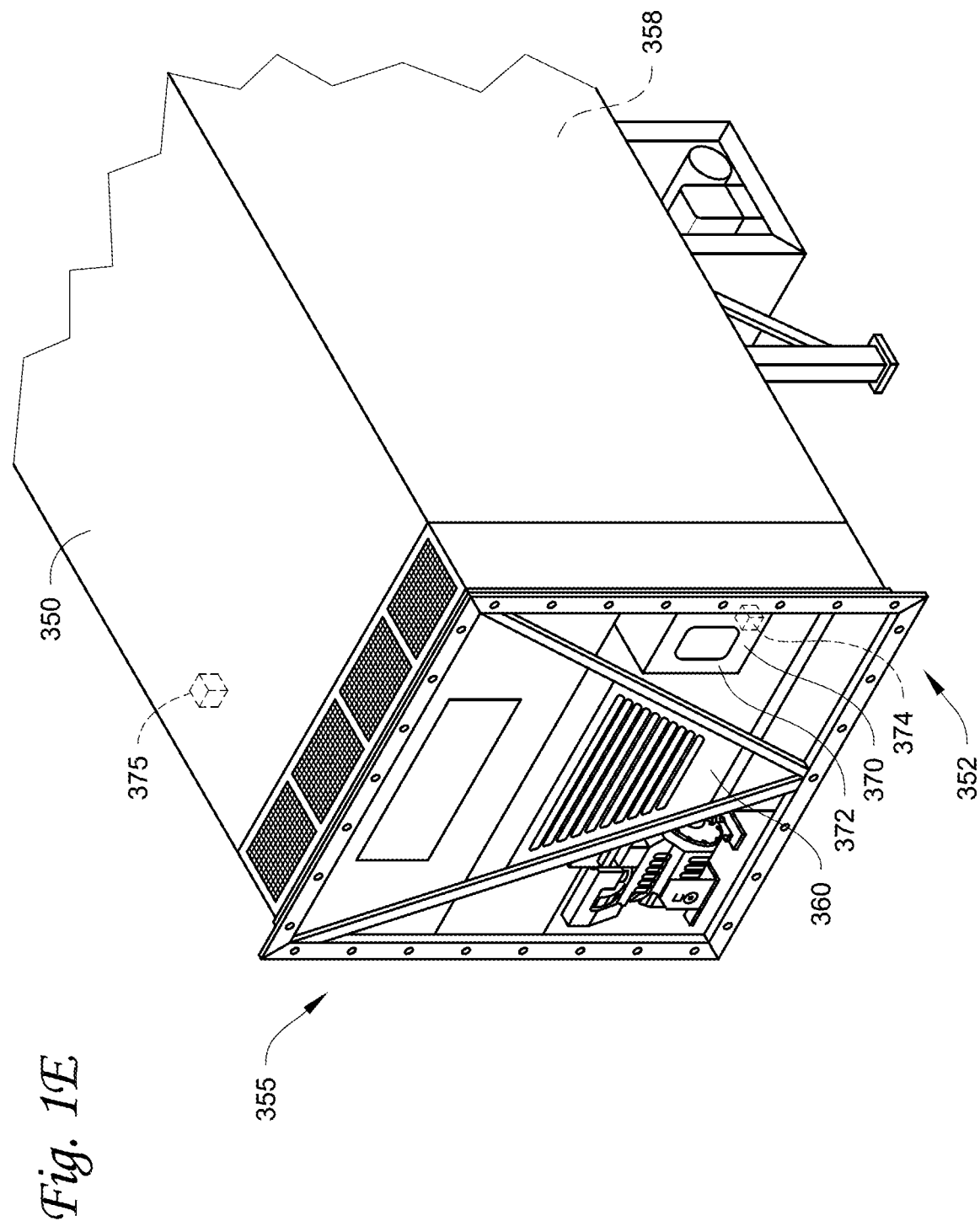

VIRTUAL DOOR SENSOR FOR TRANSPORT UNIT

FIELD

This disclosure relates generally to a door sensor for a transport unit. More specifically, this disclosure relates to methods and systems for providing a virtual door sensor for the transport unit.

BACKGROUND

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, etc.), a box car, a semi-tractor, or other similar transport unit. A transport unit with a transport climate control system is commonly used to transport perishable cargos such as produce, frozen foods, meat products, pharmaceuticals, and vaccines. A transport unit often includes one or more doors. A door sensor can indicate to an operator of whether the door has been opened or closed. A door left open may consume more energy, increase cargo spoilage, create dangerous condition in passenger vehicles, and increase the risk of losing cargo from motion or theft.

SUMMARY

This disclosure relates generally to a door sensor for a transport unit. More specifically, this disclosure relates to methods and systems for providing a virtual door sensor for the transport unit. The door sensor can be physical sensor. A physical door sensor includes mechanical or magnetic components that, when a door is opened or closed, trigger an audio, visual, or digital alert by actuating a circuit switch connected to a controller or a processor. Physical door sensors can include moving parts that can become faulty or less sensitive due to mechanical failures or vibration during transport.

By monitoring and analyzing transport climate control system operating data of a transport climate control system, a processing unit can provide a virtual door sensor that indicates or records a door event without inputs from a physical door sensor. A door event can include, for example, but not limited to, one or more doors being opened or closed.

In some embodiments, the virtual door sensor can detect a door event by analyzing the transport climate control system operating data using a machine learning algorithm trained with validated door event data. The machine learning algorithm can determine a door event, for example, by correlating a door event with trends or changes in the transport climate control system operating data. By relying on the transport climate control system operating data for detecting and/or determining door events, the virtual door sensor can be provided and be more accurate than physical door sensors. For example, a virtual door sensor can be more accurate than physical door sensors by reducing moving mechanical parts and thereby avoiding mechanical maintenance and service issues associated with some physical door sensors.

According to an embodiment, a method of providing a virtual door sensor for a transport unit is disclosed. The method includes monitoring operation of a transport climate control system for a climate controlled space to obtain transport climate control system operating data; transforming the transport climate control system operating data into door event model inputs; predicting a door event based on the obtained door event model inputs; and transmitting a notification according to the predicted door event.

In some embodiments, a virtual sensor for detecting and predicting a door event can include a vision system. Details of a vision system are described in U.S. Application No. XXX titled "METHODS AND SYSTEMS FOR CAMERA VISION APPLICATIONS FOR PERISHABLE GOODS TRANSPORTATION VISUAL AIDS TO IMPROVE PERFORMANCE," which is incorporated by reference in its entirety.

According to another embodiment, a virtual door sensor is provided for a transport climate control system. The virtual door sensor includes a controller configured to connect with a transport climate control system, and a processing unit configured to connect with the controller. The virtual door sensor is configured to monitor operation of the transport climate control system for a climate controlled space to obtain transport climate control system operating data using the controller, transform the transport climate control system operating data into door event model inputs, predict a door event with the processing unit based on the obtained door event model inputs, and transmit a notification according to the predicted door event.

In an embodiment, the machine learning algorithm trains the predictive model from the transport climate control system operating data with validated door event data. The algorithm can be developed from one or more algorithms such as random forest, logistic regression, regularizing gradient boosting, distributed gradient boosting, extreme gradient boosting ("XGBOOST"), support vector machine ("SVM"), system identification, neural networks, long short-term memory, dynamic neural networks, or other data driven method and/or a combination of physics and/or data driven methods.

BRIEF DESCRIPTION OF THE DRAWINGS

References are made to the accompanying drawings that form a part of this disclosure, and which illustrate embodiments in which the systems and methods described in this Specification can be practiced.

FIG. 1B is a side view of a truck with a transport climate control system, according to an embodiment.

FIG. 1E is a perspective view of a climate controlled transport unit, according to an embodiment.

Like reference numbers represent like parts throughout.

DETAILED DESCRIPTION

This disclosure relates generally to a door sensor for a transport unit. More specifically, this disclosure relates to methods and systems for providing a virtual door sensor for the transport unit.

A transport unit can be, for example, a truck, a van, a container (such as a container on a flat car, an intermodal container, a marine container, etc.), a box car, a semi-tractor, a bus, or other similar transport unit. Embodiments of this disclosure may be used in any suitable environmentally controlled transport units.

A climate controlled transport unit (e.g., a transport unit including a transport climate control system) can be used to transport human passengers, other animals, and/or perishable items such as, but not limited to, pharmaceuticals, biological samples produce, frozen foods, and meat products.

Figure 1A:
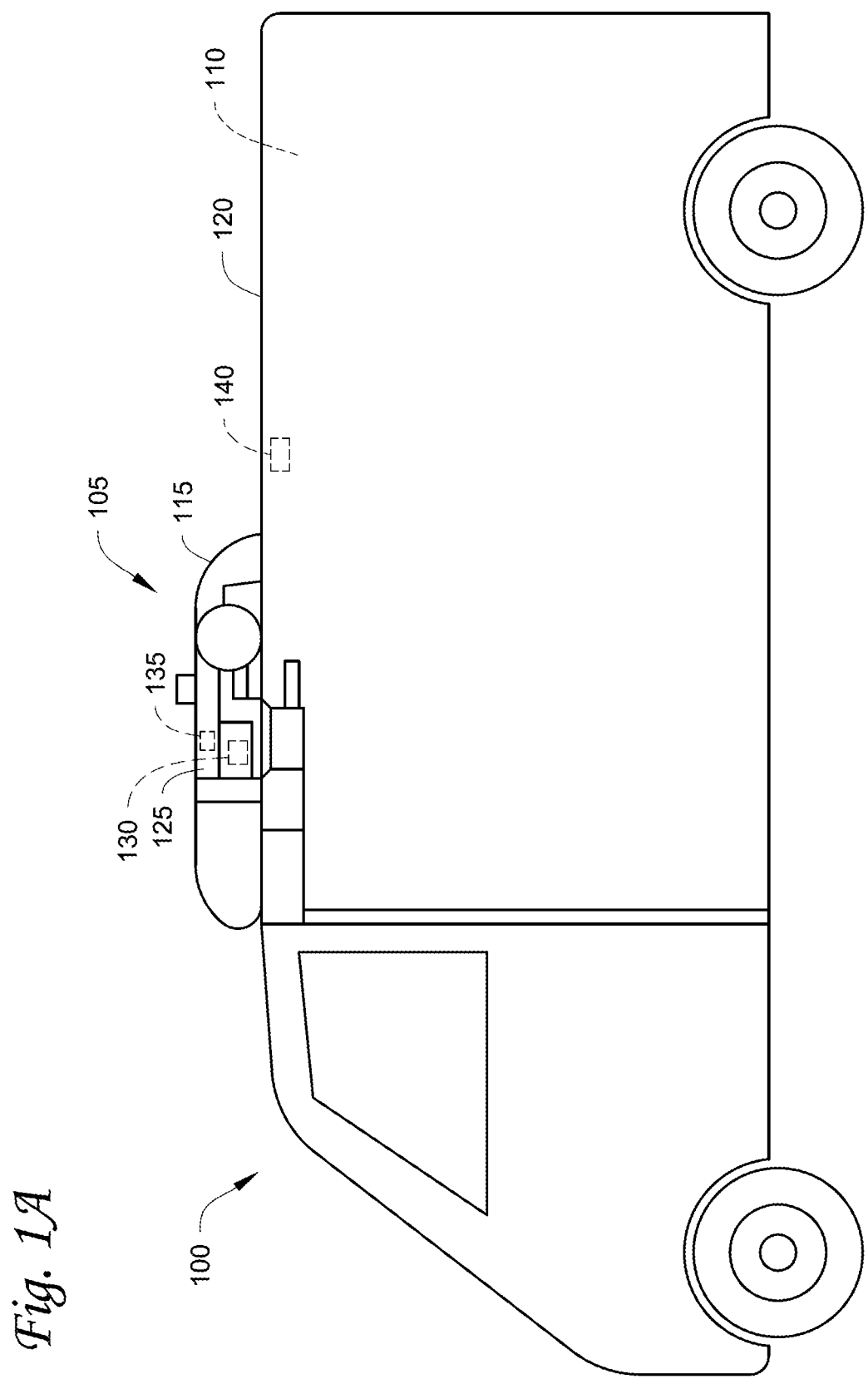
FIG. 1A is a side view of a van with a transport climate control system, according to an embodiment.
Figure 1C:
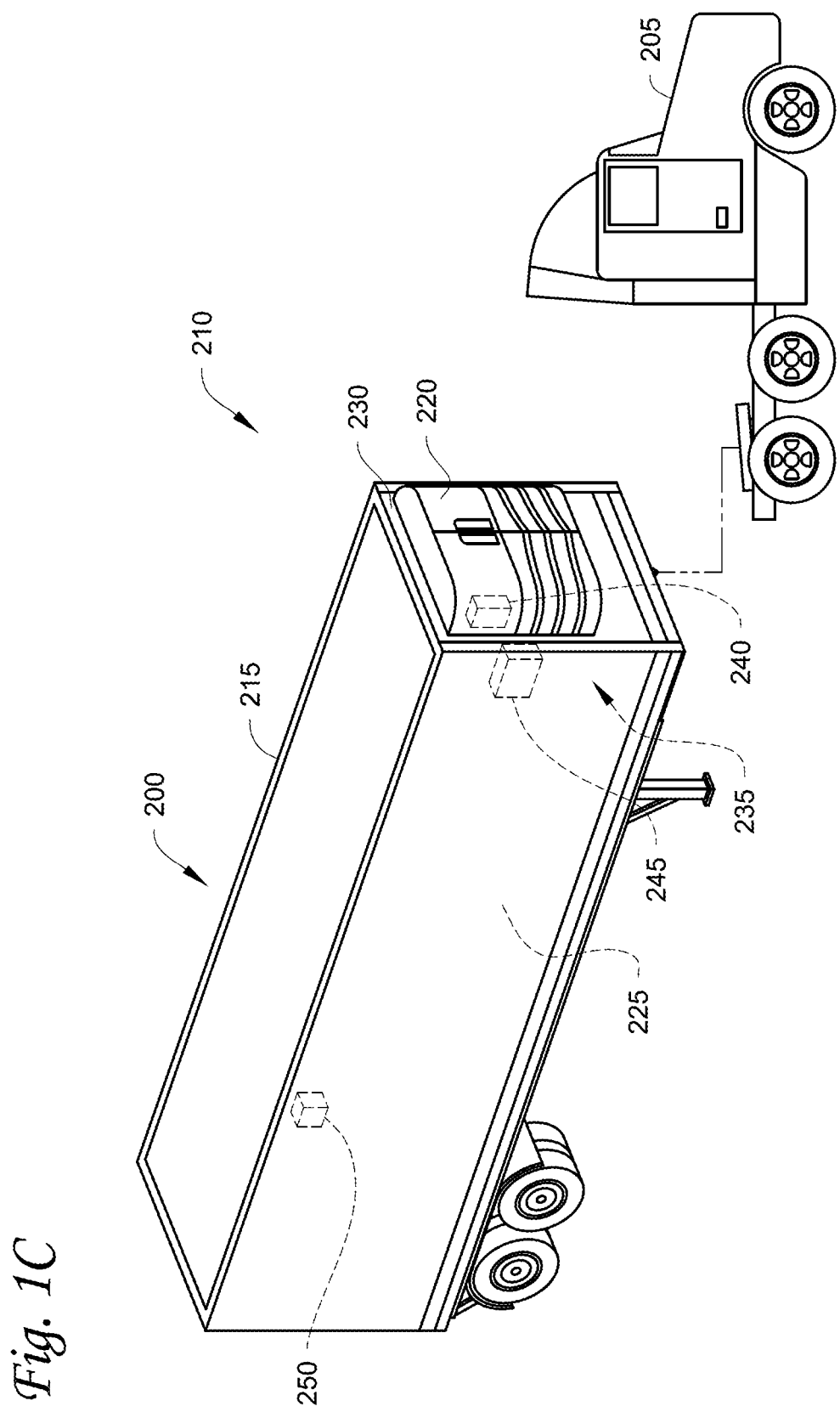
FIG. 1C is a perspective view of a trailer with a transport climate control system, according to an embodiment.
Figure 1D:
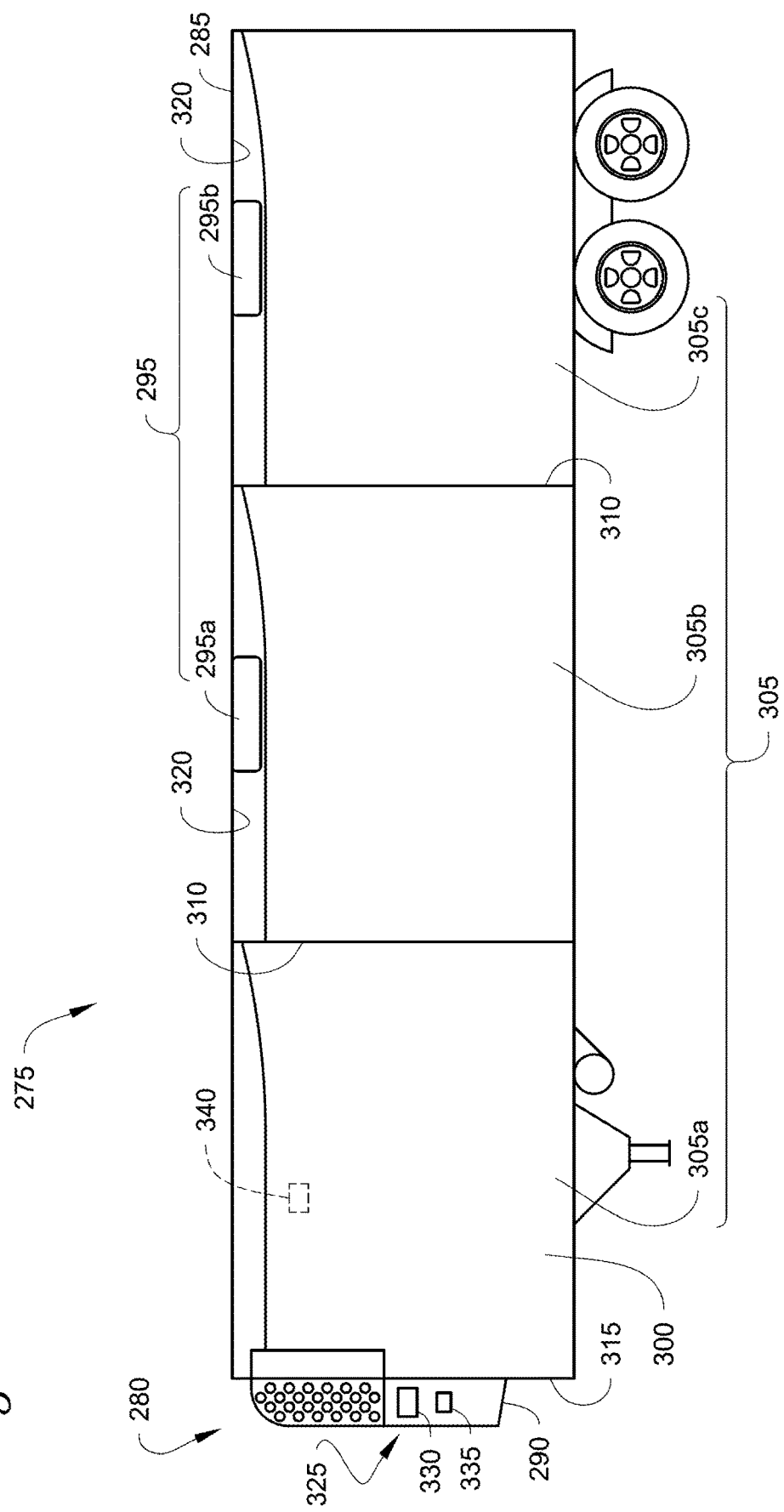
FIG. 1D is a side view of a trailer with a transport climate control system including a multi-zone transport climate control system, according to an embodiment.
Figure 1F:
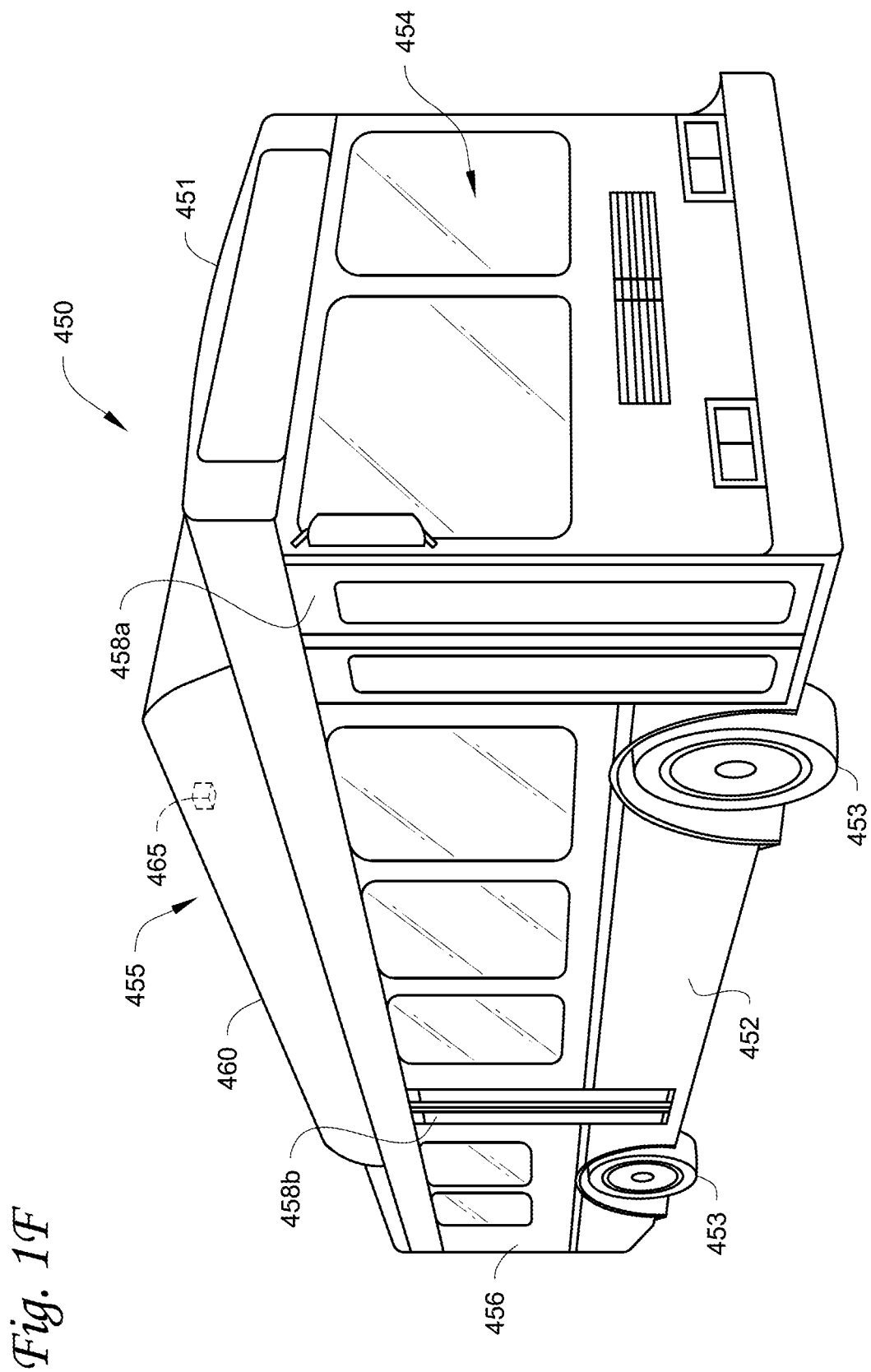
FIG. 1F is a perspective view of a climate controlled passenger vehicle, according to an embodiment.

FIGS. 1A-F show various embodiments of a transport climate control system. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate controlled transport unit 200 attachable to a tractor 205, according to an embodiment. The climate controlled transport unit 200 includes a transport climate control system 210. FIG. 1D is a side view of a climate controlled transport unit 275 including a multi-zone transport climate control system 280, according to an embodiment. FIG. 1E is a perspective view of an intermodal container 350 with a transport climate control system 355. FIG. 1F is a perspective view of a climate controlled passenger vehicle 450 with a transport climate control system 455, according to an embodiment.

FIG. 1A depicts the van 100 having the transport climate control system 105 for providing climate control within a climate controlled space 110. The transport climate control system 105 includes a climate control unit ("CCU") 115 that is mounted to a rooftop 120 of the van 100. In an embodiment, the CCU 115 can be a transport refrigeration unit.

The transport climate control system 105 can include a climate control circuit that connects, for example, a compressor, a condenser, an evaporator, and an expander (e.g., an expansion valve or other expansion devices) to provide climate control within the climate controlled space 110. As defined herein, an expander can be an expansion valve or any other type of expander that is configured to control an amount of working fluid passing there through and thereby regulate the superheat of vapor leaving an evaporator. The expander may or may not be configured to generate power. In some embodiments, the climate control circuit can be a single stage climate control circuit or a cascade climate control circuit.

It will be appreciated that the embodiments described herein are not limited to vans or climate controlled vans, but can apply to any type of transport unit (e.g., a truck, a container (such as a container on a flat car, an intermodal container, a marine container, etc.), a box car, a semi-tractor, or other similar transport unit), within the scope of the principles of this disclosure.

The transport climate control system 105 also includes a programmable climate controller 125 and one or more climate control sensors that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors can be positioned at various locations outside the van 100 and/or inside the van 100 (including within the climate controlled space 110).

The climate controller 125 is configured to control operation of the transport climate control system 105. The climate controller 125 may include a single integrated control unit 130 or may include a distributed network of climate controller elements 130, 135. The number of distributed control elements in a given network can depend upon the particular application of the principles of this disclosure. The measured parameters obtained by the one or more climate control sensors can be used by the climate controller 125 to control operation of the transport climate control system 105.

The van 100 includes a sensor 140. In the illustrated embodiment, the sensor 140 is represented as a single sensor. It will be appreciated that in other embodiments, the van 100 can include a plurality of sensors 140. In some embodiments, the sensor 140 can monitor one or more climate control parameters (e.g., temperature, humidity, atmosphere, etc.) within the climate controlled space 110 or just outside the van 100. The sensor 140 can be used by the climate controller 125 to control operation of the transport climate control system 105. The sensor 140 can be in electronic communication with a power source (not shown) of the CCU 115. In an embodiment, the sensor 140 can be in electronic communication with the climate controller 125. It will be appreciated that the electronic communication between the sensor 140 and the climate controller 125 can enable network communication of the sensed climate control parameters measured by the sensor 140. The electronic communication between the climate controller 125 and the sensor 140 can enable the sensed climate control parameters to be utilized in a control of the CCU 115.

FIG. 1B depicts the climate controlled straight truck 150 that includes the climate controlled space 160 for carrying cargo and the transport climate control system 155. The transport climate control system 155 can include, among other components, a climate control circuit that connects, for example, a compressor, a condenser, an evaporator, and an expander (e.g., an expansion valve or other expansion devices) to provide climate control within the climate controlled space 160. In some embodiments, the climate control circuit can be a single stage climate control circuit or a cascade climate control circuit. The transport climate control system 155 is configured to provide climate control within the climate controlled space 160.

The transport climate control system 155 can include a CCU 133 that is mounted to a front wall 170 of the climate controlled space 160. The CCU 133 can include, for example, the compressor, the condenser, the evaporator, and the expander. In an embodiment, the CCU 133 can be a transport refrigeration unit.

The transport climate control system 155 also includes a programmable climate controller 175 and one or more climate control sensors that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 133 into the climate controlled space 160, a return air temperature of air returned from the climate controlled space 160 back to the CCU 133, a humidity within the climate controlled space 160, etc.) and communicate climate control data to the climate controller 175. The one or more climate control sensors can be positioned at various locations outside the truck 150 and/or inside the truck 150 (including within the climate controlled space 160).

The climate controller 175 is configured to control operation of the transport climate control system 155 that may include a single integrated control unit 175 or may include a distributed network of climate controller elements 175, 180. The number of distributed control elements in a given network can depend upon the particular application of the principles described herein. The measured parameters obtained by the one or more climate control sensors can be used by the climate controller 175 to control operation of the transport climate control system 155.

The truck 150 includes a sensor 185. In the illustrated embodiment, the sensor 185 is represented as a single sensor. It will be appreciated that in other embodiments, the truck 150 includes a plurality of sensors 185. In some embodiments, the sensor 185 can monitor one or more climate control parameters (e.g., temperature, humidity, atmosphere, etc.) within the climate controlled space 160 or just outside the truck 150. The sensor 185 can be used by the climate controller 175 to control operation of the transport climate control system 155. The sensor 185 can be in electronic communication with a power source (not shown) of the CCU 133. In an embodiment, the sensor 185 can be in electronic communication with the climate controller 175. It will be appreciated that the electronic communication between the sensor 185 and the climate controller 175 can enable network communication of the sensed climate control parameters measured by the sensor 185. The electronic communication between the climate controller 175 and the sensor 185 can enable the sensed climate control parameters to be utilized in a control of the CCU 133.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 200 can include a climate control circuit that connects, for example, a compressor, a condenser, an evaporator, and an expander (e.g., an expansion valve or other expansion devices) to provide climate control within the climate controlled space 225. In some embodiments, the climate control circuit can be a single stage climate control circuit or a cascade climate control circuit.

The transport climate control system 210 includes a CCU 220. The CCU 220 is disposed on a front wall 230 of the transport unit 215. In other embodiments, it will be appreciated that the CCU 220 can be disposed, for example, on a rooftop or another wall of the transport unit 215. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate controlled space 225).

The climate controller 235 is configured to control operation of the transport climate control system 210 including components of the climate control system 210. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the transport climate control system 210. The climate controlled transport unit 200 includes a sensor 250. In the illustrated embodiment, the sensor 250 is represented as a single sensor. It will be appreciated that in other embodiments, the climate controlled transport unit 200 can include a plurality of sensors 250. In some embodiments, the sensor 250 can monitor one or more climate control parameters (e.g., temperature, humidity, atmosphere, etc.) within the climate controlled space 225 or just outside the transport unit 200. The sensor 250 can be used by the climate controller 235 to control operation of the transport climate control system 210.

The sensor 250 can be in electronic communication with a power source (not shown) of the CCU 220. In an embodiment, the sensor 250 can be in electronic communication with the climate controller 235. It will be appreciated that the electronic communication between the sensor 250 and the climate controller 235 can enable network communication of the sensed climate control parameters measured by the sensor 250. The electronic communication between the climate controller 235 and the sensor 250 can enable the sensed climate control parameters to be utilized in a control of the CCU 220.

FIG. 1D illustrates an embodiment of the climate controlled transport unit 275. The climate controlled transport unit 275 includes the multi-zone transport climate control system (MTCS) 280 for a transport unit 275 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The MTCS 280 can include, a climate control circuit in thermal communication with the climate controlled space 300. The climate controlled space 300 can be divided into a plurality of zones 305. The term "zone" means a part of an area of the climate controlled space 300 separated by walls 310. The CCU 290 can operate as a host unit and provide climate control within a first zone 305a of the climate controlled space 300. The remote unit 295a can provide climate control within a second zone 305b of the climate controlled space 300. The remote unit 295b can provide climate control within a third zone 305c of the climate controlled space 300. Accordingly, the MTCS 280 can be used to separately and independently control environmental condition(s) within each of the multiple zones 305 of the climate controlled space 300.

The climate control circuit that connects, for example, a compressor, a condenser, an evaporator, and an expander (e.g., an expansion valve or other expansion devices) to provide climate control within the climate controlled space 300 of the MTCS 280. In some embodiments, the climate control circuit can be a single stage climate control circuit or a cascade climate control circuit.

The CCU 290 is disposed on a front wall 315 of the transport unit 275. In other embodiments, it will be appreciated that the CCU 290 can be disposed, for example, on a rooftop or another wall of the transport unit 275. The CCU 290 can include portions or all of the climate control circuit, for example, the compressor, the condenser, the evaporator, and the expander to provide conditioned air within the climate controlled space 300. The remote unit 295a is disposed on a ceiling 320 within the second zone 305b and the remote unit 295b is disposed on the ceiling 320 within the third zone 305c. Each of the remote units 295a, b includes an evaporator (not shown) that connects to the rest of the climate control circuit provided in the CCU 290. In an embodiment, the CCU 290 can be a transport refrigeration unit.

The MTCS 280 also includes a programmable climate controller 325 and one or more climate control sensors that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors can be positioned at various locations outside the transport unit 275 and/or inside the transport unit 275 (including within the climate controlled space 300).

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein. The measured parameters obtained by the one or more climate control sensors can be used by the climate controller 325 to control operation of the MTCS 280.

The climate controlled transport unit 275 includes a sensor 340. In the illustrated embodiment, the sensor 340 is represented as a single sensor. It will be appreciated that in other embodiments, the climate controlled transport unit 275 can include a plurality of sensors 340. In some embodiments, the sensor 340 can monitor one or more climate control or operating parameters (e.g., temperature, humidity, atmosphere, airflow, and the like) within the climate controlled space 300. The sensor 340 can be used by the climate controller 325 to control operation of the MTCS 280.

The sensor 340 can be in electronic communication with a power source (not shown) of the CCU 290. In an embodiment, the sensor 340 can be in electronic communication with the climate controller 325. It will be appreciated that the electronic communication between the sensor 340 and the climate controller 325 can enable network communication of the sensed climate control parameters measured by the sensor 340. The electronic communication between the climate controller 325 and the sensor 340 can enable the sensed climate control parameters to be utilized in a control of the CCU 290.

FIG. 1E depicts the intermodal container 350 having the transport climate control system 355 for providing climate control within a climate controlled space 358. The transport climate control system 355 includes a climate control unit ("CCU") 360 that is mounted to a side 352 at one end of the container 350. In an embodiment, the CCU 360 can be a transport refrigeration unit.

The transport climate control system 355 can include, among other components, a climate control circuit in thermal communication with the climate controlled space 358. The climate control circuit that connects, for example, a compressor, a condenser, an evaporator, and an expander (e.g., an expansion valve or other expansion devices) to provide climate control within the climate controlled space 358. In some embodiments, the climate control circuit can be a single stage climate control circuit or a cascade climate control circuit. The transport climate control system 355 is configured to provide climate control within the climate controlled space 308.

The transport climate control system 355 also includes a programmable climate controller 370 and one or more climate control sensors that are configured to measure one or more parameters of the transport climate control system 355 (e.g., an ambient temperature outside of the intermodal container 350, an ambient humidity outside of the intermodal container 350, a compressor suction pressure, a compressor discharge pressure, a supply air temperature of air supplied by the CCU 360 into the climate controlled space 358, a return air temperature of air returned from the climate controlled space 358 back to the CCU 360, a humidity within the climate controlled space 358, etc.) and communicate the measured parameters to the climate controller 370. The one or more climate control sensors can be positioned at various locations outside the intermodal container 350 and/or inside the intermodal container 350 (including within the climate controlled space 358).

The climate controller 370 is configured to control operation of the transport climate control system 355. The climate controller 370 may include a single integrated control unit 372 or may include a distributed network of climate controller elements 372, 374. The number of distributed control elements in a given network can depend upon the particular application of the principles of this disclosure. The measured parameters obtained by the one or more climate control sensors can be used by the climate controller 370 to control operation of the transport climate control system 355.

The intermodal container 350 includes a sensor 375. In the illustrated embodiment, the sensor 375 is represented as a single sensor. It will be appreciated that in other embodiments, the intermodal container 350 can include a plurality of sensors 375. In some embodiments, the sensor 375 can monitor one or more climate control parameters (e.g., temperature, humidity, atmosphere, etc.) within the climate controlled space 358 or just outside the intermodal container 350. The sensor 375 can be used by the climate controller 370 to control operation of the transport climate control system 355. The sensor 375 can be in electronic communication with a power source (not shown) of the CCU 360. In an embodiment, the sensor 375 can be in electronic communication with the climate controller 370. It will be appreciated that the electronic communication between the sensor 375 and the climate controller 370 can enable network communication of the sensed climate control parameters measured by the sensor 375. The electronic communication between the climate controller 370 and the sensor 375 can enable the sensed climate control parameters to be utilized in a control of the CCU 360.

FIG. 1F is a perspective view of a passenger vehicle 450 including a transport climate control system 455, according to one embodiment. In the embodiment illustrated in FIG. 1F, the passenger vehicle 450 is a mass-transit bus that can carry passenger(s) (not shown) to one or more destinations. In other embodiments, the passenger vehicle 450 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses. The transport climate control system 455 can provide climate control within a climate controlled space which in this embodiment is a passenger compartment 454.

The passenger vehicle 450 includes a frame 452, the passenger compartment 454 supported by the frame 452, wheels 453, and a compartment 456. The frame 452 includes doors 458 that are positioned on a side of the passenger vehicle 450. A first door 458a is located adjacent to a forward end of the passenger vehicle 450, and a second door 458b is positioned on the frame 452 toward a rearward end of the passenger vehicle 450. Each door 458 is movable between an open position and a closed position to selectively allow access to the passenger compartment 454.

The transport climate control system 455 includes a climate control unit ("CCU") 460 that is mounted to a rooftop 451 of the passenger vehicle 450. In an embodiment, the CCU 460 can be a HVACR unit. The climate control system 455 also includes a programmable climate controller 465 and one or more sensors (not shown) that are configured to measure one or more parameters of the transport climate control system 455 (e.g., an ambient temperature outside of the passenger vehicle 450, a controlled space temperature within the passenger compartment 454, an ambient humidity outside of the passenger vehicle 450, a controlled space humidity within the passenger compartment 454, etc.) and communicate parameter data to the climate controller 165.

The transport climate control system 455 can include, among other components, a transport climate control circuit (not shown) that connects, for example, a compressor, a condenser, an evaporator, and an expander (e.g., an expansion valve) to provide climate control within the passenger compartment 144.

The transport climate control system 455 can operate in one or more operating modes including, for example, a continuous cooling mode, a start/stop cooling mode, a heating mode, a fan only mode, a null mode, a pre-conditioning mode, a dry-out mode, and a defrost mode, and the like. The transport climate control system 455 can operate in the continuous cooling mode when, for example, the transport climate control system 455 is attempting to cool the climate controlled space as quickly as possible (e.g., performing an initial pull down of the temperature in the climate controlled space to a temperature setpoint, after the transport unit has stopped to load or remove cargo from the climate controlled space, etc.). The transport climate control system 455 can operate in a start/stop cooling mode when, for example, the temperature in the climate controlled space is attempting to maintain or slowly adjust the climate in the climate controlled space (e.g., the climate controlled space has reached or is close to reaching a temperature setpoint. The transport climate control system 455 can operate in a heating mode when, for example, the transport climate control system 455 is attempting to heat the climate controlled space to a temperature setpoint. The transport climate control system 455 can operate in a fan only mode when, for example, the transport climate control system 455 is attempting to provide air flow within the climate controlled space without heating or cooling the climate controlled space. The transport climate control system 455 can operate in a null mode when, for example, the compressor is not operating and the fans may or may not be operating to provide airflow within the climate controlled space. The transport climate control system 455 can operate in a defrost mode when, for example, the transport climate control system 455 is attempting to defrost an evaporator coil of the climate control circuit. The transport climate control system 455 can operate in a pre-conditioning mode when, for example, the transport climate control system 455 is anticipating a cooling capacity change. The transport climate control system 455 can operate in the dry-out mode when, for example, the climate control circuit is operated for removing moisture from the air and/or the fans be operated to provide airflow for removing moisture within the climate controlled space by convection.

The climate controller 465 may comprise a single integrated control unit or may comprise a distributed network of climate controller elements (not shown). The number of distributed control elements in a given network can depend upon the particular application of the principles described herein. The climate controller 465 is configured to control operation of the climate control system 455 including the transport climate control circuit.

The climate control system 435 is powered by a power system (not shown) that can distribute power to the climate control system 435 when a utility power source is unavailable. In some embodiments, the power system can be a generator set (not shown) attached to the passenger vehicle 450 and electrically connected to one or more components of the climate control system 455 (e.g., a compressor, one or more fans and/or blowers, the climate controller 465, one or more sensors, and the like).

The compartment 456 is located adjacent the rear end of the passenger vehicle 450, can include the power system. In some embodiments, the compartment 456 can be located at other locations on the vehicle 450 (e.g., adjacent the forward end, etc.).

It will be appreciated that the transport climate control systems or the MTCS described above with respect to FIGS. 1A-1F can operate in multiple operating modes including, for example, a continuous cooling mode, a start/stop cooling mode, a heating mode, a fan only mode, a null mode, a pre-conditioning mode, a dry-out mode, and a defrost mode, etc.

Figure 2:
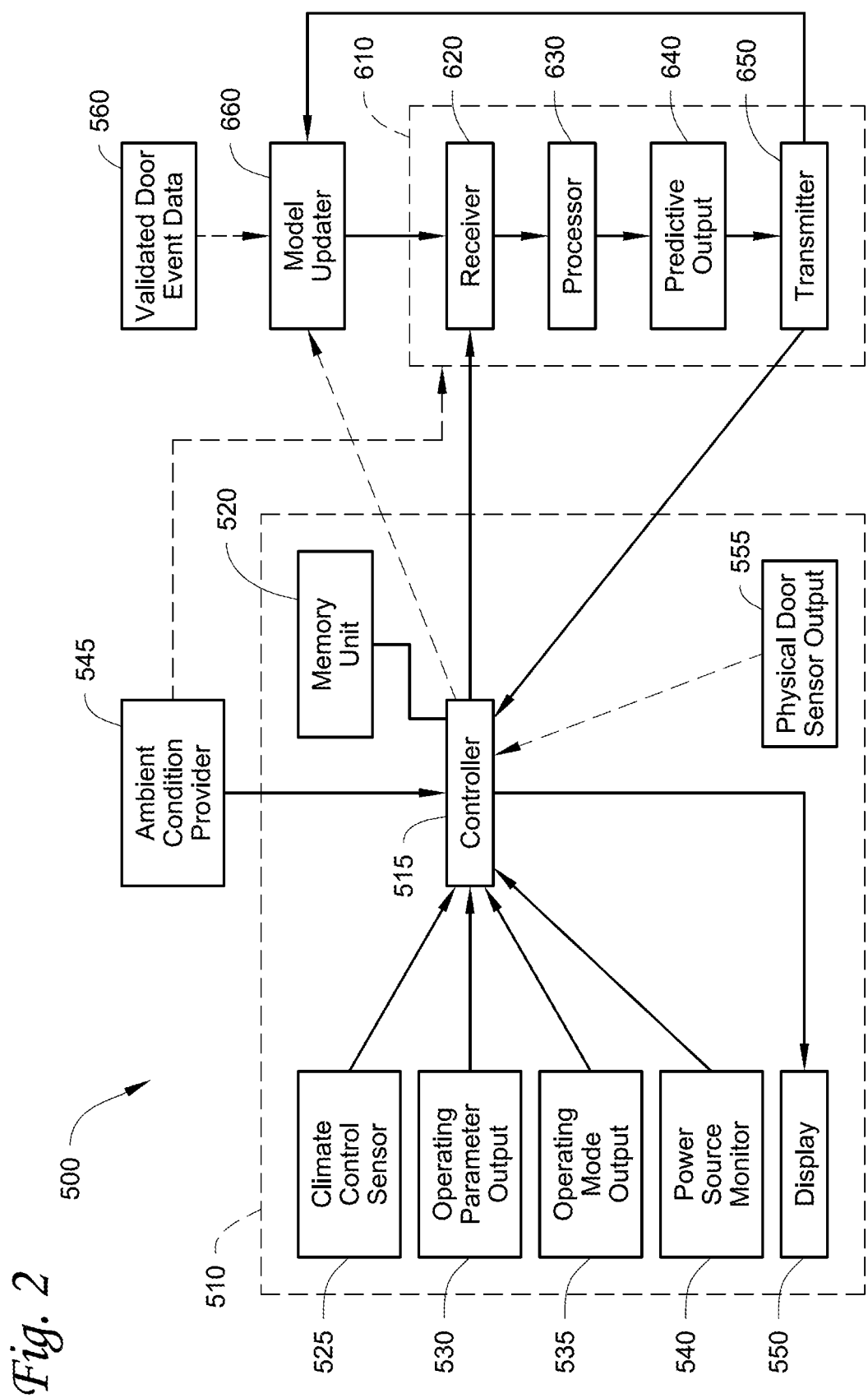
FIG. 2 is a schematic view of a transport climate control system that can operate as a virtual door sensor, according to an embodiment.

FIG. 2 is a schematic view of a transport climate control system 500 that can operate as a virtual door sensor, according to an embodiment. The transport climate control system 500 can be any of the transport climate control systems 105, 210, 355, 455, or the MTCS 280 shown in FIGS. 1A-F. In particular, a predictive model can predict a door event using transport climate control system operating data without relying on inputs from a physical door sensor.

Embodiments of a virtual door sensor can be more accurate than physical door sensors by avoiding moving mechanical parts commonly associated with physical door sensors. Moving mechanical parts can become faulty over time or due to vibration during transport. Accordingly, the virtual door sensor described herein can reduce using moving part(s) and reducing faulty readings associated with mechanical failures. Also, the virtual door sensor described herein can reduce manufacturing and maintenance cost and complexity that can occur when using a physical door sensor. It is appreciated that some embodiments of the virtual door sensor described herein can also work with a physical door sensor to increase door sensor accuracy, to train and/or update the predictive model, or the like.

The transport climate control system 500 is configured to provide climate control within a transport unit 510. The transport climate control system 500 can includes a processing unit 610 on board or remotely that communicates with the transport unit 510 via, for example, cellular or satellite networks. The transport unit 510 can be any of the transport units 100, 150, 200, 275, 350, 450 of FIGS. 1A-F. The transport unit 510 can include a climate controlled space. The transport climate control system 500 is configured to provide climate control within the climate controlled space. The transport unit 510 can include one or more doors (shown in FIGS. 1A-F) for passengers or cargo to enter and exit the climate controlled space of the transport unit 510.

The transport climate control system 500 includes a controller 515 configured to monitor one or more environmental conditions and control components of the transport climate control system. The controller 515 can include a processor configured to, for example, process received data. In an embodiment, the controller 515 can be referred to as a climate controller or a programmable climate controller. In an embodiment, the controller 515 can transmit obtained transport climate control system operating data to the processing unit 610 through cellular or satellite networks using, for example, the telematics system, a radio transmitter, or the like. In some embodiments, the controller 515 can be part of, or in communication with, the telematics system of the transport unit 510. In some embodiments, the controller 515 can be in communication with a telematics device. The telematics device is a hardware component that can be configured to provide communication between the controller 515 and other hardware or software of the transport climate control system 500 (including the processing unit 610). The telematics device can be integrated with the controller 515, integrated with a telematics system, and/or separate hardware components.

The controller 515 can be the programmable climate controller 125, 175, 235, 325, 379, 465 shown in FIGS. 1A-F. The controller 515 is configured to measure one or more environmental conditions by collecting data or interpreting electrical signals from the one or more climate control sensors 525. The controller 515 can communicate with a memory unit 520. The memory unit 520 can be a random access memory ("RAM") that can maintain a data log related to the transport climate control system 500, such as a data log of obtained transport climate control system operating data.

The controller 515 can collect transport climate control system operating data related to transport climate control system 500. The transport climate control system operating data can include, but not limited to, data log, tables, or sensor readings from the one or more climate control sensors 525, an operating parameter output 530, operating mode output 535, a power source monitor 540, an ambient condition provider 545, and/or physical door sensor output 555.

The one or more climate control sensors 525 can be the sensor or a network of sensors as in FIGS. 1A-F. The climate control sensor(s) 525 can provide, for example, an ambient temperature outside the climate controlled space of the transport unit 510, an ambient humidity outside of the transport unit 510, a supply air temperature of air supplied into the climate controlled space, a return air temperature of air returned from the climate controlled space, a humidity within the climate controlled space, or the like. In an embodiment, the one or more climate control sensors 525 include one or more temperature sensors (e.g., thermocouples) for providing temperature readings at one or more locations within the climate controlled space. In another embodiment, the one or more climate control sensors 525 include one or more humidity sensors for providing relative humidity readings within the climate controlled space. In another embodiment, the one or more climate control sensors 525 include one or more temperature sensors for providing temperature readings of the refrigerant at different locations of the climate control circuit.

The operating parameter output 530 can provide one or more operating parameters of the transport climate control system 500 to the controller 515. For example, operating parameter output 530 can be a data log of operating conditions of, for example, a compressor, an engine, a motor, or the like. The operating conditions can be measured by one or more sensors that measures temperature, pressure, RPM, and the like. In another embodiment, a telematics system of the transport climate control system 500 can provide the operating parameter output 530 to the controller 515, for example, as digital inputs. In some embodiments, the operating parameter output 530 can include, for example, one or more environmental condition setpoints within the climate controlled space, one or more environmental condition setpoint profiles, one or more equipment setpoints, and the like.

In some embodiments, the operating parameter output 530 can include a data log of, for example, operating conditions of climate control circuit equipment. The climate control circuit equipment can include a compressor, an evaporator, an expander, a valve, a condenser, a blower, an air vent, or the like. The operating conditions can be, for example, a compressor suction pressure, a compressor discharge pressure, and the like. In an embodiment, the compressor suction pressure or the compressor discharge pressure can be measured by a fluid pressure sensor disposed at, for example, an inlet or outlet of the compressor of the climate control circuit of the transport unit 510. In some embodiments, operating parameter output 530 can include a data log of valve opening or closing commands and feedback, valve status, electronic throttling valve actions, or the like.

The operating mode output 535 can provide a data log of one or more operating modes of which the transport climate control system 500 is being operated under. The data log of the one or more operating modes can be provided to the controller 515. The operating modes of the transport climate control system 500 can include a continuous cooling mode, a start/stop cooling mode, a heating mode, a fan only mode, a null mode, a pre-conditioning mode, a dry-out mode, and a defrost mode, and the like. The operating mode can be predetermined based on the desired environmental condition within the controlled space, a predetermined mode input to the controller 515 based on the passenger or cargo type, or the like. In an embodiment, the controller 515 accesses a memory portion (e.g., the memory unit 520) of the controller to obtain the operating mode output 535. In another embodiment, the telematics system of the transport climate control system 500 can provide the operating mode output 535 to the controller 515.

The power source monitor 540 can provide power source data indicating the amount of power supplied to components of the transport climate control system 500. Power source data transmitted to the controller 515 can include, for example, motor revolution per minute ("RPM"), prime mover (e.g. engine) RPM, and the like. In an embodiment, the power source monitor 540 can include power source data from one or more tachometers measuring a rotational speed of a prime mover or motor shaft of, for example, a generator, an engine, or a compressor of the transport climate control system 500. In some embodiments, the power source data can be obtained from alternator frequency readings, compressor or power source cycling records, or the like. In an embodiment, the controller 515 accesses a memory portion (e.g., the memory unit 520) of the controller to obtain the operating parameter output 530.

In an embodiment, an ambient condition provider 545 can provide one or more ambient conditions to the controller 515. The one or more ambient conditions can include, for example, an ambient temperature, an ambient air pressure, an ambient humidity, and other environmental conditions outside the transport unit 510. In an embodiment, the ambient condition provider 545 can be one or more climate control sensors 525 disposed on the outside of the transport unit 510. The ambient condition provider 545 can monitoring environmental condition(s) outside the transport unit 510. In another embodiment, the ambient condition provider 545 can provide ambient conditions based on a location information of the transport unit 510. That is, the ambient condition provider 545 can provide ambient conditions based on location data provided by a GPS module of a telematics system that communicates with the controller 515 to provide real time ambient condition(s) at a location of the transport unit 510. In some embodiment, the location data of the transport unit 510 can be provided by a location information input via a user interface on the telematics system that communicates with the controller 510. In an embodiment, the ambient condition provider 545 can provide ambient condition data to the processing unit 610, without first providing the ambient condition data to the controller 515 so as to preserve data transmission bandwidth for higher priority data required to be monitored for the transport unit 510.

In an embodiment, physical door event data 555 obtained from a physical door sensor can be provided to the controller 515. The physical door event data 555 can be a physical door sensor reading from a physical door sensor installed in the transport unit 510. The physical door event data 555 can include timestamps of door events detected by the physical door sensor. The physical door event data 555 can be used with other transport climate control operating data for predicting a door event using the predictive model.

In an embodiment, validated door event data 560 can be provided to a model updater 660 for updating the predictive model. Validated door event data 560 can be a data log of door event verified by, for example, an operator. The validated door event data 560 can be obtained from manual input or verification by an operator monitoring a door in person or virtually (e.g., by watching a video recording of the door and creating a data log of door events with timestamps). In an embodiment, the physical door event data 555 and the validated door event data 560 can be used for training or updating a predictive model used by the processing unit 610.

In an embodiment, the controller 515 accesses a memory portion (e.g. the memory unit 520) of the controller to obtain or store any of the transport climate control operating data and/or the door event model inputs (further discussed below).

The processing unit 610 can receive transport climate control system operating data from the controller 515 and can transform the transport climate control system operating data into door event model inputs. The transport climate control system operating data can include data, for example, received from at least one of the climate control sensor 525, the operating parameter output 530, the operating model output 535, or the power source monitor 540. In some embodiments, at least part of the processing unit 610 is at a remote location from the transport unit 510 communicating with the transport unit 510 via cellular or satellite networks. In some embodiments, the controller 515 can transmit (e.g., via a telematics device or system) the transport climate control system operating data by a radio to a receiver 620 of the processing unit 610. In some embodiments, the processing unit 610 can be part of the controller 515 or part of an onboard processor of the transport unit 510. In some embodiments, the controller 515 (or an onboard processor) can transform the transport climate control system operating data into door event model inputs and transmit the door event model inputs to, for example, the memory unit 520, the model updater 660, and/or the receiver 620 or the processing unit 610. In an embodiment, any data provided to the processing unit 610 is time-series data that can be used by a prediction model to find changes in climate control system data over time and predict trends. The processing unit 610 includes the receiver 620, a processor 630, a predictive output 640, and a transmitter 650. In some embodiment, the processing unit 610 can be hosted by, for example, a cloud service provider storing, transforming, and/or analyzing the transport climate control operating data.

The receiver 620 receives data from other sources via a communication medium, such as cellular or satellite communication via a wired or wireless infrastructure. For example, the receiver 620 can allow the processing unit 610 to process data at a remote and/or centralized location (e.g., a remote server, a cloud service provider, and the like) with faster hardware than the hardware onboard of the transport unit 510. Accordingly, the transport unit 510 can be operated more efficiently without the expense and complexity of installing, maintaining, and upgrading data processing software and/or hardware onboard of the transport unit 510. Transmitting the collected transport climate control system operating data to a remote processor can allow combining the collected data from multiple transport units for model training or updating. Combining data from multiple transport units can improve modeling accuracy. Further, the predicted door events can be provided on websites, dashboards, mobile devices, so that remote users, such as fleet managers, truck owners, and the like can access to the predicted door events. A record of the predicted door can be combined with other analytics such as fuel, emissions and dollar savings for improving operator behavior, or the like. In some embodiments, the processing unit 610 or the remote processor can be a remote server, a cloud service provider, etc. in communication with the transport unit 510, for example, via the telematics system.

The processor 630 analyzes the obtained transport climate control system operating data transmitted from the transport unit 510. The processor 630 can be configured to transform the obtained climate control system operating data from the controller 515 to obtain door event model inputs. The door event model inputs can be analyzed through a predictive model to provide a predicted output of a door event (i.e., a door being opened or closed). In one embodiment, the processing unit 610 transforms the transport climate control system operating data received from the controller 515 according to one or more predetermined protocols. The protocols can include format or unit conversion, combination of data categories, outlier removal, and the like. In some embodiments, transforming the transport climate control operating data can include standardizing data format received from the controller 515 to a format suitable for the hardware or software running the predictive model. For example, a first data format for a temperature sensor can be converted to a second format suitable for analysis.

In some embodiment, the transport climate control operating data can be stored and/or processed remotely. For example, some or all of the transport climate control operating data is collected via the telematics system gateway in communication with the controller 515 via a controller area network ("CAN bus"). The telematics system gateway can receive the transport climate control operating data (e.g., location data from GPS satellites, sensor data collected by the controller 515, and the like) and transmit the transport climate control operating data to an onboard or remote server. The server can be one or more server units operating a database system, such as a SQL server system. The transmission can be via one or more cellular networks (e.g., GSM, LTE, 2G, 3G, 4G, 5G, or the like) and/or satellite networks. In some embodiments, the database system can be hosted by, for example, a cloud service provider that can store, process, and/or analyze the transport climate control operating data or the door event model inputs.

In some embodiments, transforming the transport climate control system operating data can include combining categories of data for creating a more predictive variable, such as a difference between a desired setpoint temperature within the climate controlled space and a return air temperature within the climate controlled space, a difference between a discharge air temperature within the climate controlled space and a return air temperature within the climate controlled space, a return air temperature within the climate controlled space and an ambient temperature outside of the transport unit, or the like. In some embodiments, transforming the transport climate control system operating data can include determining a gradient of one or more of the return air temperature, the discharge air temperature, the compressor discharge pressure, the compressor RPM over a period of time (e.g., while the transport climate control system is operating), the motor RPM over a period of time (e.g., while the transport climate control system is operating), the prime mover RPM over a period of time (e.g., while the transport climate control system is operating), or the like.

In some embodiments, transforming the transport climate control system operating data can include eliminating data or categories of data less predictive of a door event. For example, a machine learning or statistical model can rank data categories or features by relevance to the prediction output, i.e. a door event. For example, the model can rank data categories using a wrapper-style feature selection, a recursive feature elimination, and the like. The less relevant features or data categories can be removed. For example, a feature removal algorithm can be developed from one or more algorithms such as random forest logistic regression, regularizing gradient boosting, distributed gradient boosting, extreme gradient boosting ("XGBOOST"), support vector machine ("SVM"), system identification, neural networks, long short-term memory, dynamic neural networks, or other data driven method and/or a combination of physics and/or data driven methods.

The processer 630 can be configured to enter the obtained door event model inputs into the predictive model for predicting a door event and providing a predictive output 640 of the door event prediction based on the result of the predictive model. The predictive model can be a machine learning algorithm using a data driven method or a combination of physics and data driven method. The predictive model can be trained with the validated door event data, obtained door event model inputs, and/or the transport climate control system operating data. In some embodiments, the predictive model can include one or more statistical model algorithms in data transformation and/or analysis. For example, the machine learning algorithms can be developed from one or more algorithms such as random forest, logistic regression, regularizing gradient boosting, distributed gradient boosting, extreme gradient boosting ("XGBOOST"), support vector machine ("SVM"), system identification, neural networks, long short-term memory, dynamic neural networks, or other data driven method and/or a combination of physics and/or data driven methods. For example, the predictive model can be in the form of a pickle file or joblib file used in a python environment with python libraries and predict the door events. The predictive model can receive the transport climate controlled system operating data or the door event model inputs as model inputs and make predictions at each timestamp or a predetermined interval of timestamp of model inputs.

The predictive output 640 can be an output predicting a door event, such as a data log of predicted door events with time stamps. In an embodiment, the predictive output 640 can be a probability of the state of a door obtained from the predictive model, such as a probability that a door is open, a probability that a door is closed, and the like. In another embodiment, the predictive output 640 can include a message generated by the processor 630 according to the probability of the state of the door. The message can be a textual message transmitted to the transport unit 510 via a transmitter 650. The textual or visual message can be configured to be send to a display 550 through a user interface of the telematics system of the transport system 510. For example, the display can be an LCD display providing a user interface for the telematics system. In some embodiments, textual or visual messages can be configured to be sent to a user device, for example, via a mobile app user interface on a mobile phone. The transmitter 650 can include a radio, cellular or satellite network, and/or a software transmitting the message from the processing unit 610 to the transport unit 510.

A model updater 660 can collect transport climate control system operating data for improving the predictive model deployed in the processing unit 610. In an embodiment, the model updater 660 can collect transport climate control system operating data for training and updating the predictive model used for predicting a door event or the model for transforming door event model inputs. The model updater 660 can deploy an updated predictive model for predicting door events or an updated model for transforming transport climate control system operating data to obtain the door event model inputs. The model updater 660 can receive transport climate control system operating data from the transmitter 650 of the processing unit 610. In some embodiments, the model update 660 can optionally receive transport climate control system operating data directly from the controller 515 of the transport unit 510.

In an embodiment, a predicted door event can trigger a visual or audio alert, such as a flashing light or a buzzer disposed within the transport unit 510, indicating to the operator or the passengers of a predicted door event, such as the door being opened or closed.

Figure 3:
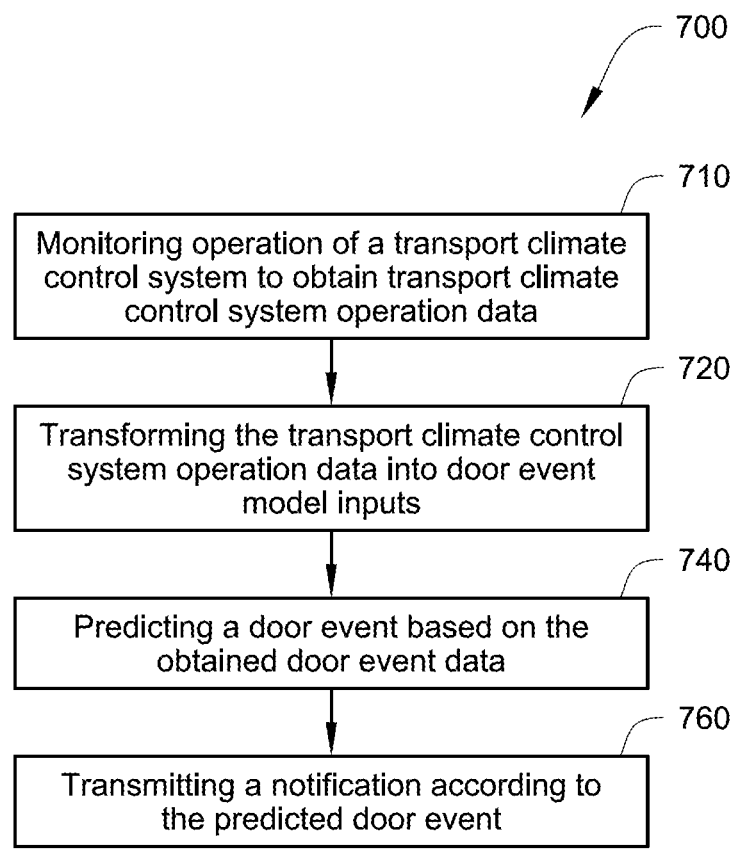
FIG. 3 is a flow chart of a method of providing a virtual door sensor, according to an embodiment.

FIG. 3 is a flow chart of a method 700 of providing a virtual door sensor using the transport climate control system 500 shown in FIG. 2, according to an embodiment. The method 700 provides the virtual door sensor by collecting transport climate control system operating data, analyzing the data to predict a door event, and transmitting a notification of the door event according to the prediction. The method can eliminate the need of a physical door sensor or can work with a physical door sensor for improving sensing accuracy.

The method 700 includes monitoring operation of a transport climate control system to obtain transport climate control system operating data at 710, transforming the transport climate control system operating data at 720, predicting a door event based on the obtained door event model inputs at 740, and transmitting a notification according to the predicted door event at 760.

At 710, the controller 515 monitors the climate control system 500 by collecting transport climate control system operating data. In an embodiment, the controller 515 monitors the transport climate control system operating data by collecting the transport climate control system operating data and transmitting the collected data to the receiver 620 of the processing unit 610. Examples of the transport climate control system operating data can include, for example, sensor readings of the climate control sensor 525, the operating parameter output 530, operating mode output 535, the output from the power source monitor 540, and the like. The method 700 then proceeds to 720.

At 720, the processor 630 transforms the transport climate control system operating data to door event model inputs for preparing the data to be analyzed by a predictive model. Transforming the transport climate control system operating data can include converting a data format, removing corrupted or incomplete data points, combining data according to predetermined algorithm for creating more predictive variables, removing less relevant features or data categories, and the like. The protocols or algorithms for transforming the transport climate control system operating data can be based on algorithmic, machine learning, physical, and/or statistical modeling or processes. For example, the protocols or algorithms can be developed from one or more algorithms such as random forest, logistic regression, regularizing gradient boosting, distributed gradient boosting, extreme gradient boosting ("XGBOOST"), support vector machine ("SVM"), system identification, neural networks, long short-term memory, dynamic neural networks, or other data driven method and/or a combination of physics and/or data driven methods.

Examples of transforming the transport climate control system operating data to door event model inputs can include, for example, a difference between a setpoint temperature within the climate controlled space and a return air temperature within the climate controlled space, a difference between a discharge air temperature within the climate controlled space and a return air temperature within the climate controlled space, a return air temperature within the climate controlled space and an ambient temperature outside of the transport unit, or the like. In some embodiments, transforming the transport climate control system operating data can include determining a gradient of one or more of the return air temperature, the discharge air temperature, the compressor discharge pressure, the compressor RPM over a period of time (e.g., while the transport climate control system is operating), the motor RPM over a period of time (e.g., while the transport climate control system is operating), the prime mover RPM over a period of time (e.g., while the transport climate control system is operating), etc. The method 700 then proceeds to 740.

At 740, the processor 630 applies the transformed operating data (e.g., the door event model input) from 720 to a prediction model for obtaining a predicted door event. The prediction model can predict (e.g., calculate a probability of a door event) that the door is opened or closed based on trends or changes in how the transport climate control system is operating. For example, the prediction model can determine, based on the door event model inputs, that the door is open if the door event model inputs indicate that the compressor is working harder than expected given the operating mode and/or the ambient conditions (e.g., is being instructed to provide more cooling capacity than expected). In another example, the prediction model can determine that the door is open when the transport climate control system is operating sooner than expected (e.g., starting up sooner during a start/stop cooling operating mode). In another example, the prediction model can determine that the door is open when the transport climate control system is operating longer than expected (e.g., running longer in a start portion of the start/stop cooling operating mode). In another example, the prediction model can determine that the door is open when the temperature in the climate controlled space has changed (e.g., the return air temperature has increased) at a rate faster than expected.

The processor 630 can produce the predicted door event when the prediction model exports a prediction output after applying the door event model inputs to the predictive model. The prediction output, for example, can include probabilities of the door is open or closed at a given timestamp. The processor 630 can generate an instruction once a probability in the production output exceeds a predetermined threshold. For example, the processor 630 can generate an instruction to indicate that a door opening event has occurred once the probability associated with the door being open exceeds 90%. Similarly, the processor 630 can generate an instruction to indicate that a door closing event has occurred once the probability associated with the door being closed exceeds 90%. The threshold can tune to user objective to minimize the real or perceived cost of either false predicted door events. For example, the threshold can be increased to reduce false predictions and improve user trust in the system. In some embodiments, the notification can be an instruction of recording a prediction output in a data log, optionally with timestamps, prediction confidences (i.e., probability of predicted outputs), or the like. In some embodiments, the notification can be an instruction of transmitting a textual or pictorial message to a user interface, for example, via a mobile app or the telematics system. In some embodiments, the prediction output can be provided as an input to, for example, another predictive model for further processing and analyzing. For example, the prediction output can be provided as an input to a transport unit or transport climate control system monitor that collects and analyzes data for evaluating operating conditions or efficiency, for predicting failures, or the like.

In some embodiments, the predictive model can be generated and maintained using a machine learning algorithm, physical modeling, a statistical modeling method, and/or other data driven algorithms with the transport climate control system operating data as inputs and predicted door events as outputs. The climate control system operating data can be transformed to door event model inputs. The door event model inputs can be transformed from climate control system operating data according to one or more algorithms or protocols. The transformation protocols can include conversion of units or file formats, scaling, normalization, outlier removal, combination of different data categories, and the like. For example, a combination can include creating a date log of the difference between ambient temperature and return air temperature. The transformation protocols can be created by the machine learning algorithm. In some embodiments, the transformation protocol can be, or generated by, a machine learning algorithm, physical modeling, a statistical modeling method, and/or other data driven algorithms. In some embodiments, transformation protocols can be part of the predictive model for predicting a door event. The transformation protocols and predictive model can be provided or updated by the model updater 660, for example, via the receiver 620 of the processing unit 610.

At 760, the transmitter 650 of the processing unit 610 transmits a notification according to the predicted door event. The notification can be shown on a display through a user interface of a telematics system associated with the transport climate control system 500. The notification can be triggered by a door event been predicted for timely providing an alert to the operator, the passengers, or a remote fleet manager of the climate control system 500. In an embodiment, the notification can transmit (e.g., via a telematics device or system) to the climate control system 500 or the transport unit 510 as a time sensitive input for triggering other transport unit equipment or operations. For example, the input can trigger a flashing light or a buzzer disposed in the transport unit 510 for alerting an operator, passenger and/or worker working around the transport unit 510. In some examples, the notification can include textual or pictorial messages displayed on a user interface indicating the door being opened or closed according to the predicted door event. In another example, the notification as a time sensitive input can trigger a data log input of the predicted door event within a door event data log for system failure prediction, system health analytics, energy consumption analysis, and the like.

Aspects. It is noted that any of aspects 1-9 can be combined with any one of aspects 10-15.

Aspect 1. A method of providing a virtual door sensor for a transport unit, the method comprising:
monitoring operation of a transport climate control system for a climate controlled space to obtain transport climate control system operating data;
transforming the transport climate control system operating data into door event model inputs;
predicting a door event based on the obtained door event model inputs; and
transmitting a notification according to the predicted door event.

Aspect 2. The method of aspect 1, wherein the transport climate control system operating data include:
an operating parameter of the transport climate control system, and
an operating mode of the transport climate control system.

Aspect 3. The method of aspect 2, wherein monitoring operation of the transport climate control system includes:
monitoring the operating parameter of the transport climate control system and the operating mode under which the transport climate control system being operated.

Aspect 4. The method of any one of aspects 2-3, further comprising:
obtaining the operating parameter from an operating parameter sensor and a controller in communication with the transport climate control system.

Aspect 5. The method of aspect 4, wherein
the operating parameter sensor is a temperature sensor disposed on a climate control circuit in thermal communication with the climate controlled space.

Aspect 6. The method of any one of aspects 2-5, wherein
the operating parameter includes a temperature setpoint within the climate controlled space, a return air temperature within the climate controlled space, and
the operating mode is a continuous cooling mode.

Aspect 7. The method of any one of aspects 1-6, further comprising
the machine learning algorithm training the predictive model from the transport climate control system operating data with validated door event data.

Aspect 8. The method of any one of aspects 1-7, further comprises:
transmitting the transport climate control system operating data using a telematics system to a remote server in communication with the telematics system for obtaining the door event model inputs and predicting the door event.

Aspect 9. The method of any one of aspects 1-8, wherein
the notification is transmitted to a user interface.

Aspect 10. The method of any one of aspects 1-9, wherein predicting the door event based on the obtained door event model inputs includes applying the obtained door event model inputs to a predictive model generated from a machine learning algorithm.

Aspect 11. A virtual door sensor for a transport unit, the virtual door sensor comprising:
a controller configured to connect with a transport climate control system, and
a processing unit configured to connect with the controller, wherein
the virtual door sensor is configured to:
monitor operation of the transport climate control system for a climate controlled space to obtain transport climate control system operating data using the controller,
transform the transport climate control system operating data into door event model inputs,
predict a door event with the processing unit based on the obtained door event model inputs, and
transmit a notification according to the predicted door event.

Aspect 12. The virtual door sensor of aspect 11, further comprising
a sensor configured to provide the transport climate control system operating data transmitted to the controller.

Aspect 13. The virtual door sensor of any one of aspects 11-12, wherein
the transport climate control system operating data include an operating parameter output and an operating mode output.

Aspect 14. The virtual door sensor of any one of aspects 13-13, further comprising
a user interface configured to display the notification according to the predicted door event.

Aspect 15. The virtual door sensor of any one of aspects 11-14, further comprising
a physical door sensor configured to transmit physical door sensor output to the controller.

Aspect 16. The virtual door sensor of any one of aspects 11-15, wherein
the processing unit is configured to communicate with the controller via a telematics system over a cellular network.

Aspect 17. The virtual door sensor of any one of aspects 11-16, wherein the virtual door sensor is configured to predict the door event based on the obtained door event model inputs by applying the obtained door event model inputs to a predictive model generated from a machine learning algorithm.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of providing a virtual door sensor for a transport unit, the method comprising:
    monitoring operation of a transport climate control system for a climate controlled space to obtain transport climate control system operating data, wherein the transport climate control system operating data includes power source data indicating an amount of power supplied to one or more components of the transport climate control system;
    transforming the transport climate control system operating data, including the power source data, into door event model inputs;
    predicting a door event based on the transformed door event model inputs, wherein predicting the door event includes applying the door event model inputs to a predictive data driven model; and
    transmitting a notification according to the predicted door event,
    wherein transforming the transport climate control system operating data includes eliminating data determined by the predictive data driven model to be less predictive of the door event by ranking the transport climate control system operating data by relevance to predicting the door event.

2. The method of claim 1, wherein predicting the door event includes generating a probability of the door event based on the obtained door event model inputs and determining the door event has occurred when the probability of the door event exceeds a predetermined probability threshold.

3. The method of claim 1, wherein transforming the transport climate control system operating data includes determining a gradient in the power source data over a period of time.

4. The method of claim 1, wherein transforming the transport climate control system operating data, including the power source data, into door event model inputs includes at least one of: converting a data format of the transport climate control system operating data, removing corrupted or incomplete data points, combining different transport climate control system operating data according to a predetermined algorithm for creating more predictive variables, removing less relevant features or data categories.

5. The method of claim 1,
    wherein the predictive data driven model provides a prediction output that includes a probability that a door is open at a given timestamp;
    wherein predicting the door event further includes determining that the door is open by comparing the probability that the door is open at the given timestamp to a predetermined threshold; and
    wherein the notification is transmitted according to the predicted door event upon determining that the probability exceeds the predetermined threshold.

6. The method of claim 1, wherein the transport climate control system operating data include:
    an operating parameter of the transport climate control system, and
    an operating mode of the transport climate control system.

7. The method of claim 6, wherein monitoring operation of the transport climate control system includes:
    monitoring the operating parameter of the transport climate control system and the operating mode under which the transport climate control system being operated.

8. The method of claim 6, further comprising:
    obtaining the operating parameter from an operating parameter sensor and a controller in communication with the transport climate control system.

9. The method of claim 8, wherein the operating parameter sensor is a temperature sensor disposed on a climate control circuit in thermal communication with the climate controlled space.

10. The method of claim 6, wherein
    the operating parameter includes a temperature setpoint within the climate controlled space, a return air temperature within the climate controlled space, and
    the operating mode is a continuous cooling mode.

11. The method of claim 1, further comprising
    a machine learning algorithm training the predictive data driven model from the transport climate control system operating data with validated door event data.

12. The method of claim 1, further comprises:
    transmitting the transport climate control system operating data using a telematics system to a remote server in communication with the telematics system for obtaining the door event model inputs and predicting the door event.

13. The method of claim 1, wherein
    the notification is transmitted to a user interface.

14. The method of claim 1, wherein the power source data includes at least one of a motor RPM of a motor providing power to the one or more components of the transport climate control system and a prime mover RPM of a prime mover providing power to the one or more components of the transport climate control system.

15. A virtual door sensor for a transport unit, the virtual door sensor comprising:
    a controller configured to connect with a transport climate control system, and
    a processing unit configured to connect with the controller, wherein the virtual door sensor is configured to:
        monitor operation of a transport climate control system for a climate controlled space to obtain transport climate control system operating data using the controller, wherein the transport climate control system operating data includes power source data indicating an amount of power supplied to one or more components of the transport climate control system,
        transform the transport climate control system operating data, including the power source data, into door event model inputs,
        predict a door event with the processing unit based on the transformed door event model inputs, wherein predicting the door event includes entering the door event model inputs into a predictive data driven model, and transmit a notification according to the predicted door event, wherein transforming the transport climate control system operating data includes eliminating data determined by the predictive data driven model to be less predictive of the door event by ranking the transport climate control system operating data by relevance to predicting the door event.

16. The virtual door sensor of claim 15, wherein the predictive data driven model provides a prediction output that includes a probability that a door is open at a given timestamp; and wherein predicting the door event further includes determining that the door is open by comparing the probability that the door is open at the given timestamp to a predetermined threshold; and wherein the notification is transmitted according to the predicted door event upon determining that the probability exceeds the predetermined threshold.

17. The virtual door sensor of claim 15, further comprising a sensor configured to provide the transport climate control system operating data transmitted to the controller.

18. The virtual door sensor of claim 15, wherein the transport climate control system operating data include an operating parameter output and an operating mode output.

19. The virtual door sensor of claim 15, further comprising a user interface configured to display the notification according to the predicted door event.

20. The virtual door sensor of claim 15, further comprising a physical door sensor configured to transmit physical door sensor output to the controller.

21. The virtual door sensor of claim 15, wherein the processing unit is configured to communicate with the controller via a telematics system over a cellular network.

* * * * *